United States Patent [19]

Ramspeck et al.

[11] E Re. 29,527

[45] Reissued Jan. 31, 1978

[54] SAFETY FOR FASTENER DRIVING TOOL

[75] Inventors: Howard B. Ramspeck, Elmhurst; Allen R. Obergfell, Park Ridge, both of Ill.

[73] Assignee: Duo Fast Corporation, Franklin Park, Ill.

[21] Appl. No.: 489,395

[22] Filed: July 17, 1974

Related U.S. Patent Documents

Reissue of:

[64] Patent No.: 3,677,456
Issued: July 18, 1972
Appl. No.: 55,178
Filed: July 15, 1970

[51] Int. Cl.[2] ..... B27F 7/22

[52] U.S. Cl. ..... 227/8; 227/130; 91/356; 91/461

[58] Field of Search ..... 227/130, 8; 91/356, 91/461

[56] References Cited

U.S. PATENT DOCUMENTS

| | | | |
|---|---|---|---|
| 2,979,725 | 4/1961 | Wandel et al. | 227/130 X |
| 2,989,948 | 6/1961 | Forrester et al. | 227/130 X |
| 3,403,600 | 10/1968 | Bade | 227/130 X |
| 3,464,614 | 9/1969 | Volkmann | 227/130 |

*Primary Examiner*—Granville Y. Custer, Jr.
*Attorney, Agent, or Firm*—Mason, Kolehmainen, Rathburn & Wyss

[57] ABSTRACT

A pneumatic fastener driving tool includes a safety arrangement that requires the tool to be placed against a workpiece before a manual trigger valve is operated in order to permit the tool to fire. Once the tool is placed against the workpiece the safety arrangement prevents "touch" firing by moving the tool toward and away from the workpiece. In two embodiments, the safety arrangement includes a piston valve which is fluid operated to close off a control line to the main valve of the tool whenever the trigger is operated before the tool is placed against a workpiece and when an attempt is made to "touch" fire the tool with the trigger held operated. In a third embodiment, metering orifices in a valve actuated by moving the tool against a workpiece prevent repeated "touch" operation of the tool.

22 Claims, 15 Drawing Figures

INVENTORS
HOWARD B. RAMSPECK AND
ALLEN R. OBERGFELL by
Mason, Kolehmainen, Rathburn and Wyss
ATTORNEYS.

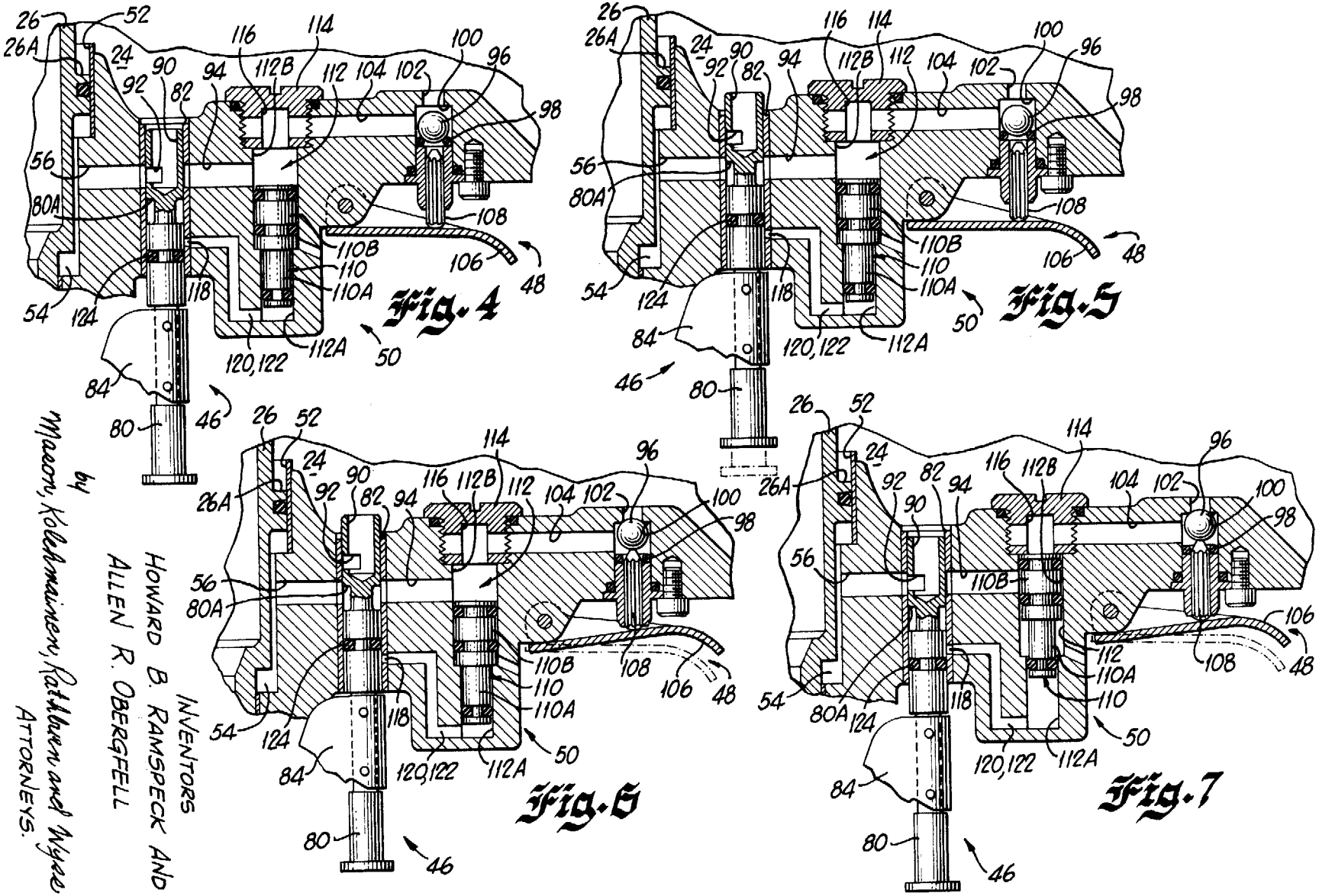
INVENTORS
HOWARD B. RAMSPECK AND
ALLEN R. OBERGFELL
by
Mason, Kolehmainen, Rathburn and Wyss
ATTORNEYS.

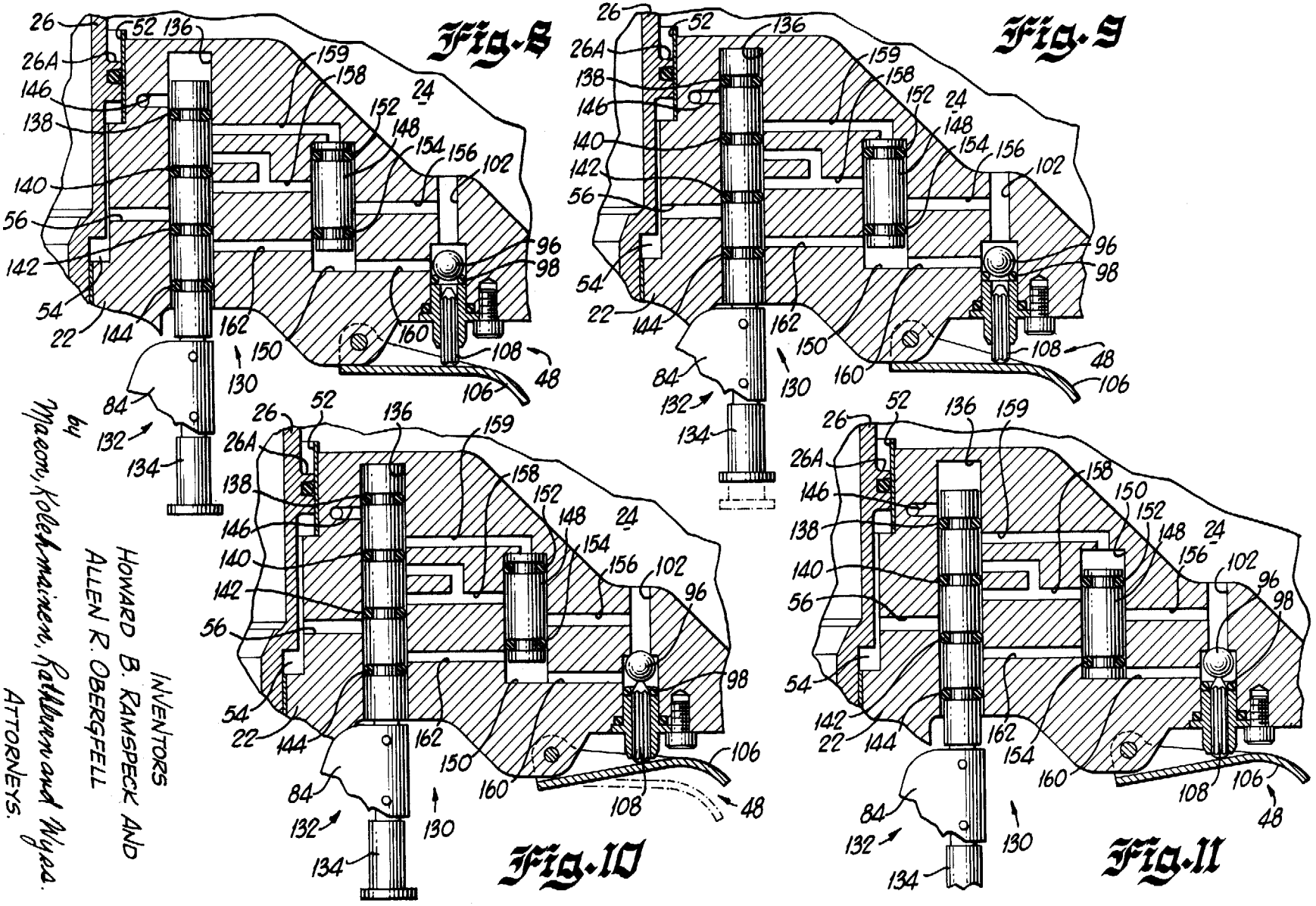
INVENTORS
HOWARD B. RAMSPECK AND
ALLEN R. OBERGFELL
by
Mason, Kolehmainen, Rathburn and Wyss.
ATTORNEYS.

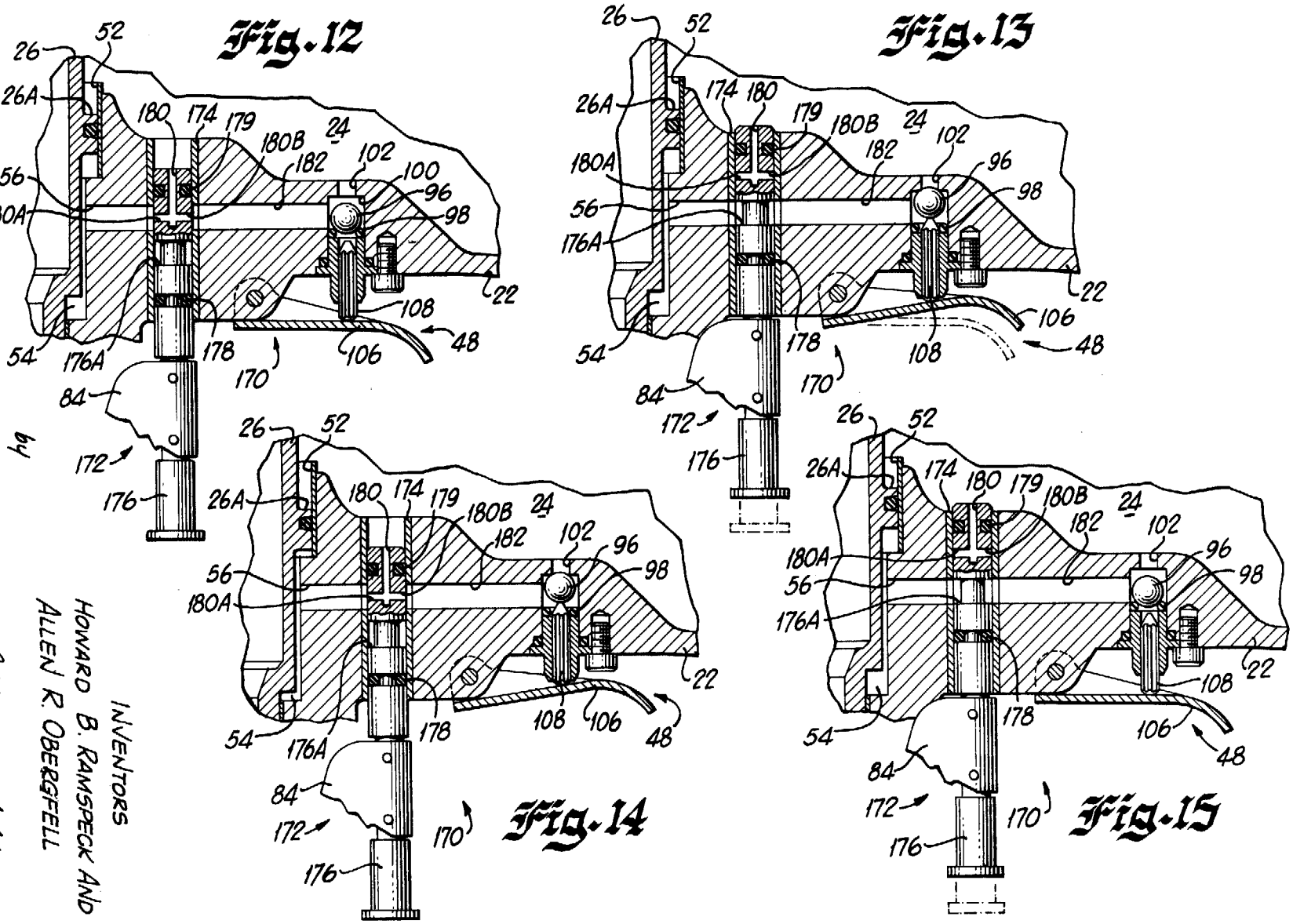
INVENTORS
HOWARD B. RAMSPECK AND
ALLEN R. OBERGFELL
by
Mason, Kolehmainen, Rathburn and Wyss
ATTORNEYS.

SAFETY FOR FASTENER DRIVING TOOL

Matter enclosed in heavy brackets [ ] appears in the original patent but forms no part of this reissue specification; matter printed in italics indicates the additions made by reissue.

The present invention relates to a fastener driving tool and more particularly to a safety arrangement for a fastener driving tool which prevents accidental or inadvertent firing of the tool.

Pneumatic fastener driving tools, particularly those adapted to drive large fasteners in certain industrial working conditions, have long included safety devices effective to prevent the tool from being fired or operated by trigger actuation unless or until the tool is adjacent the workpiece. These safety devices have included both pneumatic and mechanical interlocks. Some of these safety devices are such that the safety and trigger can be operated in any sequence, and others require the operation of the safety prior to the operation of the trigger. Some of these safety devices, generally those that are indifferent to the sequence of the trigger and safety operation, are capable of "touch" firing, i.e., the tool can be operated by moving the tool toward and away from the workpiece while holding the trigger operated. This "touch" firing is quite desirable in a number of applications because it increases the speed at which the fasteners can be driven.

As an example, the mechanical safety arrangements shown and described in U.S. Pat. No. 3,198,412 and shown in FIGS. 1–5 of U.S. Pat. No. 3,056,965 are ones in which the usual trigger control is mechanically locked in a released state until a mechanical latch is released by placing the tool against a workpiece. This mechanical latch is, however, incapable of "touch" firing. In the mechanical arrangement shown, for example, in FIGS. 6–11 of U.S. Pat. No. 3,056,965 and in U.S. Pat. No. 3,194,324, the safety arrangements include differential levers or shifting lever fulcrums to achieve "touch" firing of the tool using the safety. However, these tools are not disabled when the trigger is actuated prior to the safety. The natures of these mechanical interlocks used to achieve either control over the sequence of safety-trigger operation or "touch" firing using the safety are not such that a single basic tool design can be used in the factory to construct either of the two types of controls. Further, the mechanical linkages are often capable of being "teased" with the result that undesired multiple firing may occur due to tool recoil.

Pneumatic safety arrangements are known which require the tool to be adjacent the workpiece before the tool can be fired. Examples of this type of safety are shown and described in U.S. Pat. Nos. 2,979,725; 3,112,489; and 3,252,641. In this type of safety, the tool is operated by the last to be operated of the trigger and safety, and there is no control requiring the safety to be operated first in order to fire the tool. These tools are, however, capable of "touch" firing.

There is a growing tendency to establish more demanding safety standards for pneumatic fastener driving tools, particularly those tools using larger fasteners and particularly in those industrial applications in which working conditions are such that accidental operation of a tool may cause injury. These standards can require two separate and distinct operations to cause the operation of the tool, or that the tool cannot be operated unless the tool is placed against a workpiece before the trigger is operated, or that the tool is disabled if the tool is lifted from the workpiece, thus preventing "touch" firing. Some standards may permit an initial "touch" firing but none after the initial tool operation. It would be desirable to satisfy all of these standards with a pneumatic safety because of the advantage in this type of control. Further, because the safety standards are not universally applicable, it would be desirable to provide a basic tool that could be factory constructed to either meet these standards or provide the old safety arrangement providing "touch" firing.

Accordingly, one object of the present invention is to provide a new and improved pneumatic or fluid actuated fastener driving tool.

Another object is to provide a fastener driving tool including a new and improved safety arrangement.

A further object is to provide a new and improved pneumatic safety arrangement for fastener driving tools which requires the operation of the safety prior to the manual or trigger operation of the tool in order to achieve tool operation.

A further object is to provide a new and improved pneumatic safety for a fastener driving tool which prevents "touch" firing of the tool.

A further object is to provide a pneumatic safety arrangement for a fastener driving tool which is easily constructed to provide an inhibited actuating sequence or "touch" firing of the tool.

A further object is to provide a pneumatic safety arrangement using a pneumatically biased control valve whose pressure responsive surfaces are selectively vented and pressurized by the safety and trigger valves to control the firing of the tool.

In accordance with these and many other objects, an embodiment of the present invention comprises a pneumatically actuated tool for driving fasteners such as staples and nails which includes a housing defining a pressurized fluid reservoir and including a cylinder in which is slidably mounted a piston actuated fastener driving means. A main valve assembly and an exhaust valve assembly for the top of the cylinder are provided by which the upper end of the interior of the cylinder is selectively connected to the reservoir or to the atmosphere to drive the fastener driving means through power and return strokes. The main and exhaust valve means are selectively controlled by a trigger actuated valve means and a safety valve means actuated by engagement between the tool and the workpiece in which the fastener is to be driven. A control arrangement is provided relating the safety valve means and the trigger valve means to insure that the tool cannot be operated when the trigger is actuated before the tool is placed against a workpiece and to further insure that once the tool has been removed from the workpiece the tool cannot be again actuated without releasing and reoperating this trigger after the tool has again been placed against the workpiece.

In two embodiments the control arrangement includes a piston valve pneumatically biased in opposite directions and normally held in a position permitting operation of the tool by a bias supplied under the control of the trigger valve. If the trigger valve is operated prior to the actuation of the safety means, one of the pneumatic biases is removed and the piston valve is shifted to a blocking position to insure that the tool cannot thereafter be operated without restoring the tool to its normal condition. In these two embodiments the removal of the tool from the workpiece to release the safety means while the trigger is held operated is also effective to shift the piston valve to an obstructing position to prevent any further operation of the tool by "touch" firing, i.e., by reciprocating the tool relative to the workpiece.

In a third embodiment, the safety valve stem is provided with a pair of metering orifices interconnecting the controls for the main valve with the reservoir and the trigger valve. In this arrangement, the tool can be "touch" fired for its first operation but thereafter the tool is rendered incapable of being operated unless the trigger valve is released and reoperated.

Many other objects and advantages of the present invention will become apparent from considering the following detailed description in conjunction with the drawings in which:

FIG. 4 is a fragmentary sectional view in partially schematic form of a part of the safety control arrangement rotated 90° to facilitate illustration of the control safety arrangement in a normal condition;

FIG. 5 is a schematic sectional view similar to FIG. 4 illustrating the control arrangement with the safety valve means actuated;

FIG. 6 is a schematic elevational view similar to FIGS. 4 and 5 showing the control arrangement with both the trigger valve and the safety valve operated to produce tool operation;

FIG. 7 is a schematic sectional view similar to FIGS. 4–6 showing the control arrangement in a position preventing tool operation resulting from operation of the trigger valve prior to the operation of the safety valve;

FIG. 8 is a schematic fragmentary sectional view of a second safety control arrangement for the tool shown in FIG. 1, the control arrangement being shown in its normal position;

FIG. 9 is a fragmentary sectional view similar to FIG. 8 showing a safety valve means in an operated state;

FIG. 10 is a fragmentary sectional view similar to FIGS. 8 and 9 showing the safety control arrangement with the trigger and safety valves operated to control the operation of the tool;

FIG. 11 is a fragmentary sectional view similar to FIGS. 8–10 showing the safety control arrangement in a setting preventing operation of the tool arising from premature operation of the trigger valve means;

FIG. 12 is a fragmentary sectional view of a third embodiment of a safety control arrangement for the tool shown in FIG. 1, the arrangement being shown in a normal position;

FIG. 13 is a fragmentary sectional view similar to FIG. 12 illustrating the setting of the arrangement used to effect operation of the tool;

FIG. 14 is a fragmentary sectional view similar to FIGS. 12 and 13 illustrating the safety valve means in a released position and a trigger valve means in an operated position; and FIG. 15 is a fragmentary sectional view similar to FIGS. 12–14 illustrating the safety valve means in an operated position and the trigger valve means in a normal position.

Figures 1, 2, 3:
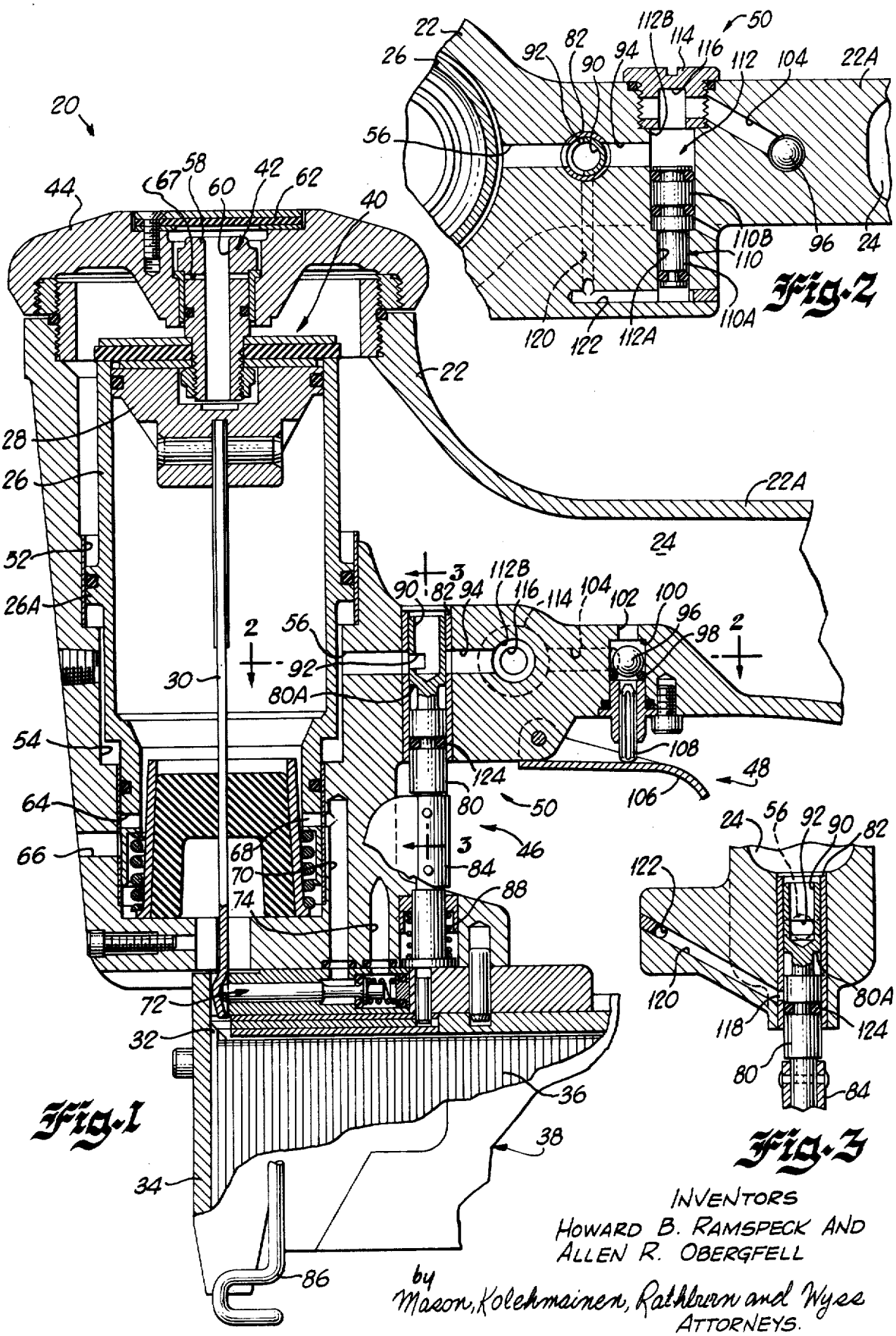
FIG. 1 is a fragmentary sectional view of a pneumatic fastener driving tool including a safety control arrangement forming a first embodiment of the invention.
FIG. 2 is a sectional view taken along line 2—2 in FIG. 1.
FIG. 3 is a sectional view taken along line 3—3 in FIG. 1.

Referring now more specifically to FIG. 1 of the drawings, therein is illustrated a fastener driving tool which is indicated generally as 20 and which embodies the present invention. The tool 20 includes a housing 22 with a hollow handle portion 22A forming a reservoir 24 continuously supplied with a pressurized fluid such as compressed air. Disposed within the housing is a cylinder 26 containing a slidably mounted piston 28 to which the upper end of a fastener driving blade or element 30 is secured. The lower end of the blade 30 is slidably received within a drive track 32 formed within a nosepiece structure 34 to which fasteners such as individual staples 36 are successively supplied by a magazine assembly indicated generally as 38. The open upper end of the cylinder 26 is normally closed by a main valve assembly indicated generally as 40 which is connected to an exhaust valve assembly indicated generally as 42. The exhaust valve assembly 42 is slidably mounted on a closure cap 44 which closes and forms part of the housing 22.

The operation of the tool 20 or more specifically of the fluid motor provided by the cylinder 26 and the piston 28 is controlled by a safety valve assembly indicated generally as 46 and a trigger valve means or assembly indicated generally as 48. A safety control assembly indicated generally as 50 including the valve means 46 and 48 permits the main valve 40 to open and the exhaust valve 42 to close, thereby admitting pressurized air from the reservoir 24 into the cylinder 26 to drive the piston 28 through a fastener driving stroke only when the safety valve assembly 46 is actuated by placing the nosepiece 34 adjacent a workpiece and thereafter actuating the trigger valve assembly 48. If the tool 20 is lifted away from the workpiece so as to release the safety valve assembly 46 following an initial operation of the tool and during a period in which the trigger valve means 48 is maintained operated, as in an effort to achieve "touch" firing, the assembly 50 disables the tool 20 from further operation until the trigger 48 has been released and again operated following movement of the nosepiece 34 against the workpiece.

The construction and operation of the tool 20 except for the provision of the safety control arrangement or assembly 50 and a slight modification in the exhaust valve assembly 42 is identical to that shown and described in U.S. Pat. No. 2,979,725. Accordingly, only a brief summary of the construction and operation of this tool is set forth herein. It should be understood that many other arrangements using fluid actuated piston or diaphragm main valve and exhaust assemblies that are well known in the art can be used with the safety control assembly 50 of the present invention.

The cylinder 26 includes a piston portion 26A slidably mounted within a cylindrical insert 52 in the housing 22 with the upper surface of the piston portion 26A continuously exposed to the pressurized fluid or compressed air in the reservoir 24. In the normal condition of the tool 20 shown in FIG. 1, the area beneath the piston 26A and a similar shouldered portion on the lower end of the cylinder 26 are disposed within a chamber 54 supplied with pressurized fluid through an inlet passage 56 so that the upper edge of the cylinder 26 is pneumatically biased upwardly by a net upwardly directed force against a resilient gasket in the main valve assembly 40, this assembly being biased downwardly against the cylinder 26 by the pressurized fluid acting on its exposed upper surface. The exhaust valve 42 provides a stop limiting downward movement of the main valve 40.

When the tool 20 is to be operated, the passage 56 is connected to the atmosphere under the control of the assemblies 46, 48, and 50, and the pressurized fluid acting on the upper surface of the piston portion 26A moves the cylinder 26 downwardly to separate its upper edge from the main valve 40. This supplies compressed fluid to the bottom surface of the main valve 50 so that it moves upwardly until the upper end of a stem 58 having an axially extending passage 60 abuts against a resilient member 62, the space beneath which is vented to the atmosphere. This closes off the exhaust connection to the atmosphere normally provided through the passage 60 and provides a large area separation between the main valve 40 and the cylinder 26 so that the piston 28 is driven downwardly by the pressurized fluid admitted to the cylinder 26 from the reservoir 24. As the cylinder 26 moves downwardly, an opening 64 therein moves into alignment with an opening 66 in the housing 22 to provide a vent or exhaust connection for the air trapped beneath the piston 28. During this downward movement, the lower end of the blade 30 strikes a staple 36 and drives it through the drive track 32 into the workpiece.

When the tool 20 is to be released, the assemblies 46, 48, and 50 again supply compressed air to the passage 56 in the chamber 54 so that the cylinder 26 is moved upwardly. The cylinder 26 moves upwardly until it again engages the main valve 40 which is now disposed in an abutting relation with the closure cap 44. This moves the opening 64 out of alignment with the opening 66 and seals off the lower end of the interior of the cylinder 26. The cylinder 26 is now sealed by the main valve 40 with compressed air trapped between the top of the piston 28 and main valve. This trapped air leaks off to the atmosphere through a group of metering orifices 67 to produce a net downwardly directed force acting on the top of the main valve 40 which moves this valve, the exhaust valve 42, and the cylinder downwardly to the position shown in FIG. 1.

This moves another opening or passage 68 in the lower end of the cylinder 26 into alignment with a discharge opening from a passage 70 in the housing 22. Whenever the piston 28 is displaced from its normal position, a valve assembly indicated generally as 72 is opened to interconnect the passage 70 with a passage 74 that is continuously supplied with pressurized fluid from the reservoir 24. Accordingly, pressurized piston return air from the reservoir 24 is now supplied beneath the piston 28 which is at the lower end of its stroke. The part of the cylinder 26 above the piston 28 is now connected to atmosphere through the passage 60, and the air supplied through the opening 68 beneath the piston 28 is effective to restore the piston 28 to its normal position. When the piston 28 reaches this position, a depression in the lower end of the driver blade 30 releases the valve 72 so that compressed air is no longer supplied to the interior of the cylinder 26 beneath the piston 28. This completes the power and return strokes of the fastener driving blade 30 under the control of the fluid motor provided by the piston 28 and the cylinder 26.

The safety control assembly 50 including the safey valve assembly or safety means 46 and the trigger valve means 48 selectively control the alternate connection of the passage 56 to the atmosphere and to the pressurized fluid in the reservoir 24 in accordance with the conditions under which the tool 20 can be operated. The safety valve assembly 46 is substantially identical to that shown and described in the above-identified U.S. Pat. No. 2,979,725 and includes a valve stem 80 slidably mounted within a sleeve 82 in the housing 22. A somewhat U-shaped element 84 connected to an intermediate portion of the valve stem 80 carries a wire frame or actuating element 86 which protrudes slightly below the lower end of the nosepiece structure 34 and is adapted to be moved upwardly and to produce a corresponding upward movement of the valve stem 80 when the tool 20 is placed against a workpiece, this movement taking place against the resilient bias of a compression spring 88 coupled to the lower end of the valve stem 80.

In the normal position of the safety valve 46 shown in FIG. 1, compressed air is supplied directly from the reservoir 24 to the passage 56 through a bore 90 and an opening 92 from the bore 90 through the wall of the stem 80. When the operator 86 engages the workpiece to move the valve stem 80 upwardly against the resilient bias provided by the spring 88 (FIG. 5), the passage 92 is sealed off by the sleeve 82 and a reduced diameter portion 80A on the valve stem 80 places the passage 56 in communication with passage 94. Whenever the tool 20 is moved away from the workpiece, the bias provided by the spring 88 coupled with pneumatic bias applied to the exposed upper surfaces of the stem 80 move the stem from the actuated position shown in FIG. 5 to the normal position shown in FIG. 1.

The trigger valve assembly 48 is substantially identical to that shown and described in detail in the above-identified U.S. Pat. No. 2,979,725. In general, the assembly 48 includes a ball valve 96 resting on an O-ring 98 within a valve chamber 100 in the housing 22. The upper end of the chamber 100 is placed in direct communication with the reservoir 24 through a passage or opening 102. In the normal position of the valve assembly 48, compressed air is supplied through the passage 102 and the chamber 100 to an outlet passage 104 (FIGS. 1 and 2). When a trigger element 106 pivotally mounted on the housing 22 is actuated or pivoted in a counterclockwise direction, a fluted or ribbed valve stem 108 is moved upwardly to engage the ball valve 96 and move it upwardly to the position shown, for example, in FIG. 6 in which the passage 102 is closed. In this position, the ball valve 96 no longer rests on the resilient O-ring 98, and the chamber 100 as well as the outlet passage 104 are connected to the atmosphere through the recesses in the fluted valve stem 108. When the trigger 106 is released, the pneumatic bias applied to the ball 96 by the pressurized fluid in the reservoir 24 restores the trigger valve assembly 48 to the condition shown in FIG. 1.

A valve piston 110 (FIG. 2) in the assembly 50 effects the control of the main valve 40 in dependence on the sequence of operation of the safety valve assembly 46 and the trigger valve assembly 48. The valve piston 110 includes a smaller diameter portion 110A and a larger diameter portion 110B slidably mounted in corresponding diameter portions 112A and 112B of a cylindrical recess 112 in the housing 22. The cylinder 112 extends generally transverse to the housing 22, is closed at its small diameter end 112A, and is closed by a threaded fitting 114 at its large diameter end. The fitting 114 is provided with a passage 116 which places the outlet passage 104 from the trigger valve means 48 in communication with the large diameter portion 112B of the cylinder 112. This large diameter portion 112B of the cylinder 112 also communicates with the passageway 94 extending to the safety valve assembly 46. The small diameter portion 112A of the cylinder 112 is placed in communication with an opening 118 (FIG. 3) in the sleeve 82 over a pair of passageways 120 and 122. The opening 118 is so disposed in the sleeve 82 to be positioned above a sealing O-ring 124 on the valve stem 80 when this valve stem is in its normal position (FIGS. 1 and 3) and to be disposed beneath the O-ring 124 when the valve stem is in its operated position.

The proper and improper operation of the tool 20 under the control of the assembly 50 is illustrated in schematic diagrams of FIGS. 4–7. In these figures, the piston valve 110 and the connecting passageways have been rotated to lie within a common plane to facilitate the illustration of the operation of the assembly 50. In the normal condition of the tool 20 and the safety control assembly 50, compressed air from the reservoir 24 passes through the bore 90, the opening 92, and the passageway 56 to the chamber 54. This acts on the lower piston surfaces of the cylinder 26 including the lower surface of the piston portion 26A to hold the tool 20 in a normal inoperated state. In addition, compressed air from the reservoir 24 passes through the passageways 102, 104, and 116 to be supplied to the large diameter cylinder 112B. This forces the valve piston 110 to the position illustrated in FIG. 4. In addition, the compressed air supplied to the cylinder 112B passes through the passageway 94 and together with air from the reservoir 24 passes around and through the interface between the valve stem 80 and the sleeve 82 in the area disposed above the O-ring 124 to be supplied to the passageways 120 and 122. This air acts on the lower end of the small diameter piston 110 and tends to bias the valve piston 110 upwardly. However, since compressed air is supplied to the large diameter cylinder 112 to act on the greater exposed surface of the large diameter piston 110B, the valve piston 110 is maintained in the position shown in FIG. 4.

Assuming that the tool 20 is to be operated in the proper sequence by first placing the nosepiece 34 against the workpiece, this movement actuates the operator 86 (FIG. 1) and moves this operator and the connected safety valve stem 80 upwardly from the position shown in dot-and-dash outline in FIG. 5 to the position shown in solid outline therein. When the safety valve stem 80 moves to the position shown in FIG. 5, the opening 92 is sealed by the sleeve 82 to cut off the flow of air into the passage 56 from the reservoir 24 through the bore 90. However, the reduced diameter portion 80A on the valve stem 80 moves into alignment with the illustrated openings in the sleeve 80, and the passageway 56 is now supplied with compressed air from the reservoir 24 over the passageways 102, 104, 116, and 94. In addition, when the safety valve stem 80 moves to the operated position shown in FIG. 5, the O-ring 124 thereon moves above the opening 118 in the sleeve 82. Thus, the compressed air previously supplied to the lower end of the cylinder 112A is vented to the atmosphere over the passageways 120 and 122 and along that portion of the interface between the sleeve 82 and the stem 80 disposed beneath the O-ring 124. Thus, the pneumatic bias acting on the small diameter piston 110A of the piston valve 110 is removed. Thus, when the safety valve assembly 46 is first operated, the tool 20 is not operated, but control over the supply of pressurized fluid to the chamber 54 is transferred to the trigger valve assembly 48 and the pneumatic bias is removed from one end of the piston valve 110.

Since the nosepiece 34 of the tool 20 is now pressed against the workpiece, as signified by the actuation of the safety valve assembly 46, the tool 20 can be operated by manually actuating the trigger valve assembly 48 from the normal position shown in dot-and-dash outline in FIG. 6 to the position shown in solid outline therein. When the trigger 106 is moved to this position, the valve stem 108 is raised to elevate the ball valve 96 to a position closing the passage 102. When the ball valve 96 is lifted out of engagement with the O-ring 98, the passageway 104 is connected to the atmosphere through the recesses along the stem 108. This connects the chamber 54 to the atmosphere over the passageway 56, the recesses portion 80A of the valve stem 80, the passageway 94, the upper end of the large diameter cylinder 112B, and the passageway 116. This causes the cylinder 26 to move downwardly as described above and initiate a power stroke or fastener driving stroke of the tool 20. The position of the piston valve 110 is not shifted even though the upper end of the large diameter cylinder 112B is connected to the atmosphere inasmuch as the small diameter cylinder 112A is also connected to the atmosphere over the path described above. The tool 20 remains in this condition until either the safety valve assembly 46 or the trigger valve assembly 48 is released.

Assuming that the operator of the tool 20 now attempts to "touch" fire the tool by moving the nosepiece 34 away from the workpiece so that the safety assembly 46 is restored to its normal position and the trigger valve assembly 48 is held in its operated position as illustrated in FIG. 7 of the drawings. When the safety valve assembly 46 moves to its normal position, the valve stem 80 moves downwardly, and compressed air from the reservoir 24 is again forwarded through the bore 90 and the opening 92 to the passageway 56. This causes the cylinder 26 to move upwardly and the piston 28 to be returned to its normal position in the manner described above. At the same time the O-ring 124 moves to a position interposed between the opening 118 and the atmosphere, and compressed air from the reservoir 24 passes along the interface between the stem 80 and the sleeve 82 through the opening 118 and the passageways 120 and 122 to be collected in the small diameter cylinder 112A. Since the trigger valve assembly 48 is held operated to close the passageway 102 with the ball valve 96, the large diameter cylinder 112B is held at atmosphere, and the pressurized fluid collected in the small diameter cylinder 112A acts on the exposed surface of the small diameter piston 110A to move the valve piston 110 to the piston shown in FIG. 7. In this position, the upper two O-rings on the large diameter piston 110B seal off communication between the passageways 116 and 104 and the passageway 94.

When an attempt is now made to cause operation of the tool 20 by again placing the nosepiece 34 against the workpiece, the safety valve assembly 46 is operated and the valve stem 80 moves upwardly to the position shown in FIG. 6. This cuts off the supply of pressurized fluid from the reservoir 24 through the opening 92, and moves the O-ring 124 above the opening 118 so that the pressurized fluid collected in the small diameter cylinder 112A may be discharged to the atmosphere in the manner described above. However, even though the reduced diameter portion 80A on the valve stem 80 again couples the passages 56 and 94, the passageway 94 is cut off from connection to the atmosphere through the passageways 104 and 116 since the valve piston 110 is in the position shown in FIG. 7. Thus, the compressed air previously supplied to the chamber 54 cannot be vented to the atmosphere, and the tool 20 cannot operate. The tool 20 can be operated only by releasing the trigger valve assembly 48 by removing manual pressure from the trigger 106. This permits the compressed air acting on the ball valve 96 to move the stem 108 and thus the trigger 106 downwardly to the position shown in dot-and-dash outline in FIG. 7. The ball valve 96 seats against the O-ring 98 to close off the exhaust connection, and compressed air from the passageway 102 enters the passageway 104 to act on the greater area of the exposed surface of the large diameter piston 110B. This moves the valve piston 110 downwardly to the position shown in FIG. 6. When the valve piston 110 moves downwardly, compressed air from the passgeways 104 and 116 flows into the passageway 94. Since the safety valve assembly 46 is operated, this air also flows through the reduced diameter portion 80A and the passageway 56 to hold the cylinder 26 in its up position. When the trigger valve assembly 48 is reoperated, the control assembly 50 is restored to the condition shown in FIG. 6 and the tool 20 is operated in the manner described above.

To illustrate the control over the proper sequence of operation of the safety valve means 46 and the trigger valve means 48, it is assumed that the control assembly 50 is restored to the normal condition shown in FIG. 5. If the trigger valve means 48 is now operated to the position shown in solid line in FIG. 7 without actuating the safety valve assembly 46 so that this assembly remains in the position shown in FIG. 7, the movement of the ball valve 96 to close the passageway 102 and to open the exhaust passage along the ribs on the valve stem 108 places the passageways 104 and 116 at atmosphere pressure. Since the safety valve assembly 46 has not been operated, the O-ring 124 on the valve stem 80 is disposed beneath the opening 118, and pressurized fluid is supplied to the small diameter cylinder 112A. This moves the piston valve 110 upwardly to the position shown in FIG. 7 and closes off communication between the passageways 94 and 104. Thus, the passageway 94 cannot be connected to the atmosphere, and subsequent actuation of the safety valve assembly 46 to the position shown in FIGS. 5 and 6 cannot cause operation of the tool 20. This can only be achieved in the manner described above by placing the nosepiece 34 of the tool against the workpiece and thereafter releasing and reoperating the trigger valve assembly 48.

Referring now more specifically to FIGS. 8–11 of the drawings, therein is illustrated a control assembly 130 forming a second embodiment of the invention for selectively preventing operation of the tool 20 when a safety valve assembly or safety means indicated generally as 132 is not operated prior to the actuation of the manual trigger valve assembly 48. The assembly 130 also prevents "touch" firing of the tool 20. The safety control assembly 130 is shown in conjunction with a portion of the tool 20 shown in detail in FIG. 1 of the drawings. The manual valve assembly 48 is identical to the like numbered assembly in the tool 20.

The safety valve means 132 includes a value stem 134 slidably mounted within a cylinder 136 in the housing 22 and coupled to the same connecting means 84 as provided in the tool 20. The valve stem 134 carries four longitudinally spaced O-rings 138, 140, 142, and 144. A passageway 146 in the housing 22 communicated with the atmosphere at one end and opens into the cylinder 136 at its other end.

The safety control assembly 130 also includes a valve piston 148 slidably mounted within a cylinder 150 and carrying a pair of O-rings 152 and 154 adjacent its opposite ends. The valve piston 148 is responsive to the operation of the safety means 132 and the trigger valve assembly 48 to insure that the tool 20 cannot be either "touch" fired or actuated without first operating the safety means 132 followed by the actuation of the trigger means 48.

In the normal condition of the tool (FIG. 8), compressed air from the reservoir 24 passes through a passageway 156 and through the cylinder 150 around the valve piston 148 in the area disposed between the O-rings 152 and 154 to a passage 158. One branch of the passage 158 supplies air through the cylinder 136 between the O-rings 140 and 142 to the passage 56 so that the chamber 54 is pressurized to hold the cylinder 26 in its upper position. The other branch of the passage 158 supplies pressurized air which flows through the cylinder 136 between the O-rings 138 and 140 and over a passage 159 to apply a pneumatic bias to one end of the valve piston 148. The other end of the cylinder 150 is connected through a passage 160 to the reservoir 24 through the passage 102 and the trigger valve assembly 48. Thus, the equal areas on the opposite ends of the valve piston 148 are both subjected to pressurized fluid of equal pressure.

Assuming that the tool 20 is operated in its proper sequence, the operator 86 (FIG. 1) is first moved upwardly by placing the nosepiece 34 of the tool 20 against the workpiece. This shifts the safety valve stem 134 upwardly from the position shown in dot-and-dash outline in FIG. 9 to the position shown in solid line therein. In this position, compressed air supplied by the passage 160 to the lower end of the cylinder 150 is now forwarded over a passage 162 and through the cylinder 136 in the area bounded by the O-rings 142 and 144 to the passage 56. This supplies a continuing source of pressurized fluid for maintaining the cylinder 26 in its upper position. When the valve stem 134 moves to the position shown in FIG. 9, the O-ring 142 moves between the ports terminating the passage 56 in the lower branch of the passage 158 to close off the previous supply of pressurized fluid for the passage 56. Further, the O-ring 140 moves to a point between the ports terminating the upper branch of the passage 158 and the passage 159 to close off the source of biasing pressure to the upper end of the valve piston 148. The passage 159 is now placed in communication with the exhaust passage 146 through the portion of the cylinder 136 bounded by the O-rings 138 and 140. Thus, the pressurized fluid is discharged from the upper end of the cylinder 150 and the valve piston 148 is now subjected to only an upwardly directed biasing force.

With the nosepiece 34 (FIG. 1) of the tool 20 now disposed on the workpiece and the safety valve means 132 actuated, the tool can now be operated by actuating the trigger valve means 48 by moving the trigger 106 from the normal position shown in dot-and-dash outline in FIG. 10 to the position shown in solid outline therein. This moves the valve stem 108 upwardly to elevate the ball valve 96 from the position resting on the resilient O-ring 98 to a position in which it closes off the lower end of the passage 102. The ball valve 96 now prevents the flow of pressurized fluid from the passage 102 to the passage 160 and connects the passage 160 to the atmosphere along the flutes or ribs on the valve stem 108. Thus, the chamber 54 is discharged to atmosphere over the path including the passage 56, the portion of the cylinder 136 bounded by the O-rings 142 and 144, the passageway 162, and the lower end of the cylinder 150. The valve piston 148 does not move from the illustrated position inasmuch as no pneumatic bias is applied thereto, and this valve piston is held in position by frictional engagement of the O-rings 152 and 154 with the adjacent walls of the cylinder 150. The tool 20 can be restored to its normal position in which the main valve assembly 40 is again closed either by releasing the trigger valve assembly 48 so that compressed air is again supplied from the passage 102 to the passage 56 through the passages 160 and 162 or by releasing the safety means 132 so that pressurized fluid is supplied to the passage 56 through the lower branch of the passage 158 and the passage 156.

Assuming that an attempt is made to "touch" fire the tool 20 by retaining the trigger valve assembly 48 in the operated position shown in FIG. 10 and by removing the nosepiece structure 34 from the workpiece, the valve stem 134 moves from the operated position shown in FIG. 10 to the normal position shown in FIG. 8. In so moving, compressed air from the lower branch of the passage 158 is again supplied to the passage 56 to close the main valve 40 and to open the exhaust valve 42. Further, compressed air is supplied from the upper branch of the passage 158 to the top surface of the valve piston 148, the connection to atmosphere being closed off by the O-ring 138. When this happens, the valve piston 148 moves downwardly because no bias is applied to the lower end of this valve piston. This setting of the control assembly 130 is illustrated in FIG. 11. In this position of the valve piston 148, the lower O-ring 154 is disposed between the passageways 160 and 162 to close off the connection to the atmosphere. In addition, the O-ring 142 of the valve stem 134 moves between the ports terminating the passageways 56 and 162 to further interrupt the connection of the chamber 54 to the atmosphere. In addition, in the lower position of the valve piston 148 pressurized fluid from the passage 156 passes through the cylinder 150 between the O-rings 152 and 154 to be supplied to the passage 162 as well as the passage 158.

If an attempt is now made to reactuate the tool by again pressing the tool 20 adjacent the workpiece, the valve stem 134 moves upwardly, and the O-ring 142 is interposed between the ports terminating the lower branch of the passageway 158 and the passageway 56. This interrupts the flow of pressurized fluid supplied to the chamber 54 from the passage 158. However, the ports terminating the passages 162 and 56 are now placed in communication by a portion of the cylinder 136 disposed between the O-rings 142 and 144, and the passageway 162 is supplied with pressurized fluid from the passageway 156. Thus, compressed air is supplied to the chamber 54, and the tool is not operated.

The only way in which the tool can be operated is to release and reactuate the trigger valve assembly 48. When this assembly is released, the ball valve 96 seats on the O-ring 98 to close off the connection to atmosphere for the passage 160, and this passage is connected to reservoir air pressure through the passage 102. Since the valve stem 134 is actuated, the top surface of the valve piston 148 is vented. Thus, the compressed air supplied to the passage 160 shifts the valve piston 148 upwardly to the position shown in FIGS. 8–10. This closes off communication between the passageways 156 and 162 and places the passageway 162 in communication with the passage 160 which is now pressurized. Thus, the tool 20 remains in its normal state. The reactuation of the trigger valve assembly 148 connects the passageway 160 to atmosphere in the manner described above, and the tool is then operated.

When the tool 20 is in its normal state, the safety control means 130 prevents operation of the tool if the trigger valve means 48 is operated prior to the actuation of the safety means 132. Thus, if the trigger valve means 48 is operated to its actuated position (FIG. 11) with the safety valve 132 in its normal state, the ball valve 96 closes off the passageway 102 and connects the passageway 160 to the atmosphere. Since the safety means 132 is in its normal state, pressurized fluid is supplied from the upper branch of the passageway 158 and the passageway 159 to the top surface of the valve piston 148. Accordingly, when the passage 160 places the lower end of the cylinder 150 at atmospheric pressure, the valve piston 148 moves downwardly to the position shown in FIG. 11. This closes off communication between the passageways 160 and 162 and couples the passage 162 to the pressurized passageway 156. Thus, these two passages maintain the supply of pressurized fluid to the chamber 54, and the tool 20 cannot be operated. The tool 20 can be operated from this position only by actuating the safety means 132 and by releasing and reactuating the trigger valve assembly 48.

FIGS. 12–15 of the drawings illustrate a third embodiment of the invention includes a safety control assembly indicated generally as 170 which coordinates and interrelates the control of the tool 20, the trigger valve assembly 48, and a safety means indicated generally as 172 to prevent "touch" operation of the tool 20. The safety control assembly 170 does not require the trigger valve means 48 and the safety means 172 to be operated in any particular sequence to achieve the initial operation of the tool 20, but does insure that the trigger valve assembly 48 is operated and released incident to each additional operation of the tool 20.

The safety valve assembly or safety means 172 includes a sleeve 174 in which is slidably mounted a safety valve stem 176. The valve 176 includes a lower sealing O-ring 178 and an upper sealing O-ring 179 between which is disposed a recessed area 176A movable into and out of communication with a pair of aligned openings in the sleeve 174. The upper end of the valve stem 176 is provided with a somewhat T-shaped passage 180, one end of which is in continuous communication with the reservoir 24 through the open end of the sleeve 174. The passageway 180 terminates in two oppositely extending ports or passageways 180A and 180B of equal area.

In the normal condition of the tool 20, compressed air flows through the passageways 180 and 180A to be supplied to the passageway 56 in the chamber 54 so as to hold the cylinder 26 in its upper position in which the main valve 40 (FIG. 1) is closed. The compressed air supplied by the passageway 180 is supplemented by pressurized fluid supplied from the reservoir 24 through the passageway 102 and a passageway 182 which communicates with the passageway or port 180B.

Assuming that the tool is to be operated, either the safety means 172 or the trigger means 48 can be operated first. Assuming that the trigger valve assembly 48 is first operated by moving the trigger 106 from the position shown in dot-and-dash outline in FIG. 13 to the position shown in solid outline therein, the passageway 182 is connected to the atmosphere along the valve stem 108 when the ball valve 96 moves off the O-ring 98, the ball valve 96 closing the passageway 102. The tool 20, however, will not operate at this time inasmuch as the equal area ports 180A and 180B maintain sufficient pressure in the chamber 54 to hold the cylinder 26 in its upper position. Assuming, however, that the safety means 172 is now operated to move the valve stem 176 from the position shown in dot-and-dash outline in FIG. 13 to the position shown in solid outline therein, the passageways 180A and 180B are sealed by the sleeve 174 and the recessed area 176A and places the passageways 56 and 182 in direct communication. This permits the air in the chamber 54 to be exhausted to the atmosphere and the tool is operated. The tool can be operated equally well by first actuating the safety means 172 to the position shown in FIG. 13 in which the recessed area 176 places the passageways 56 and 182 in direct communication and thereafter operating the trigger valve means 48 to connect the passageway 182 to the atmosphere. Thus, the tool 20 can be actuated by operating the assemblies 48 and 172 in any sequence.

Assuming, however, that an attempt is made to "touch" fire the tool 20 by releasing the safety means 172 while maintaining the trigger valve assembly 48 in its actuated condition, the control assembly 170 is placed in the position shown in FIG. 14. In this position the passageways 180, 180A and 180B again provide communication between the passageways 56 and 182 and connect these passageways to the reservoir 24. Since, however, the passageways or ports 180A and 180B are of equal area, the passageway 180 cannot supply adequate air to the chamber 54 to move the cylinder 26 upwardly to its normal position, and the tool 20 cannot be restored to its normal condition to permit a subsequent operation. This is true even though the safety stem 176 is reciprocated between its operated and normal positions shown in FIGS. 13 and 14, respectively, because the passageway 182 is held at atmosphere by the actuated trigger valve means 48.

In connection with the inability of the tool to operate with the safety means 170 released and the trigger valve assembly 48 operated and the inability of the tool to restore to normal after operation with the safety means 170 released and the trigger valve assembly 48 operated, it should be noted that the upper edge surfaces of the cylinder 26 are sealed from exposure to the pressurized fluid in the reservoir 24 when the tool is in its normal position, and these same edge surfaces are exposed to the fluid pressure when the tool is operated. This means that a greater force is required to close the main valve 40 than to maintain it closed. With the chamber 54 fully pressurized at the time of opening the trigger valve assembly 48, the drop across the passageways 180A, 180B holds the main valve assembly 40 closed. However, when the tool has been operated, the chamber 54 starts at atmospheric pressure, and the drop across the passageways 180A, 180B prevents enough elevation in the pressure in the chamber 54 to provide the added upward bias to overcome the added downward bias due to the now exposed upper edge surfaces of the cylinder 26.

In order to achieve a second operation of the tool 20 following its initial operation, it is necessary to release and reoperate the trigger valve assembly 48. Thus, the nosepiece structure 34 of the tool 20 is placed against the workpiece to move the safety valve stem 176 to the position shown in solid line in FIG. 15. This places the passageways 56 and 182 in direct communication through the recessed area 176A on the valve stem 176. When the trigger valve 48 is released and moves to the position shown in FIG. 15, compressed air from the passageway 102 passes through the passageway 182 and around the recessed area 176A to be supplied to the passageway 56 and the chamber 54. This restores the cylinder 26 to its normal position so that when the trigger valve 48 is reactuated to close the passageway 102 and to open the passageway along the valve stem 108, by moving out of engagement with the O-ring 98, pressurized fluid in the chamber 54 is dumped to the atmosphere, and the tool can be operated. Thus, following the initial operation of the tool 20, the safety stem 176 must be maintained in an operated state, and the tool can be operated only by actuating and releasing the trigger valve means 48.

Although the safety control assemblies 51, 30, and 170 have been illustrated in conjunction with the tool 20 in which tool actuation is produced by venting the controls for the main valve to the atmosphere, these control assemblies with alternations in their normal states can be used with tools in which main valve operation is effected by supplying pressurized fluid. Further, the tools 20 using the control arrangements 50 and 130 can be factory constructed to provide touch-trip merely by using a plug in the cylinders 112 and 150 to afford continuous communication between the passageways 104 and 94 and 160 and 162, respectively, in place of the valve pistons 110 and 148. The tool using the safety control assembly 170 requires only the use of the usual safety valve stem such as the valve stem 80 in place of the valve stem 176 in order to be factory constructed to provide touch-tripping. Thus, the safety control arrangements illustrated are such as to permit the basic construction of the tool 20 to be factory constructed to provide the known control permitting touch-tripping for the controlled operation of the present invention.

Although the present invention has been described with reference to three illustrative embodiments thereof, it should be understood that many other objects and advantages may be devised by those skilled in the art that will fall within the true spirit and scope of the principles of this invention.

What is claimed as new and desired to be secured by Letters Patent of the United States is:

1. In a tool for driving fasteners into a workpiece using a pressurized fluid motor for actuating a fastener driving means, a manually actuated trigger valve means, a safety means actuated by placing the tool adjacent the workpiece, fluid actuated valve means controlled by the trigger valve means and the safety means for controlling the application of pressurized fluid to the fluid motor, and a control means including a fluid pressure operated piston means, said control means interconnecting the trigger valve means and the safety means to prevent the operation of the fluid actuated valve means unless the safety means is first actuated followed by the actuation of the trigger valve means.

2. In a tool for driving fasteners into a workpiece using a fluid motor actuated driving means, a fluid actuated valve means for controlling the application of pressurized fluid to the fluid motor,
a trigger valve means,
a safety valve means actuated by placing the tool adjacent the workpiece,
passage means coupling the trigger and safety valve means to the fluid actuated valve means to control the operation of the fluid actuated valve means,
and control means coupled to said passage means and controlled by the trigger and safety valve means for preventing actuation of the fluid actuated valve means unless the safety valve means is first operated followed by the trigger valve means.

3. In a tool for driving fasteners into a workpiece using a fluid motor actuated driving means,
a fluid actuated valve means for controlling the application of pressurized fluid to the fluid motor;
a trigger valve means,
a safety valve means actuated by placing the tool adjacent the workpiece,
passage means coupling the trigger and safety valve means to the fluid actuated valve means to control the operation of the fluid actuated valve means,
and a fluid actuated valve in said passage means having both a normal position and an operated position, said fluid actuated valve being selectively coupled to pressurized fluid and the atmosphere by one of said trigger and safety valve means and being actuated from said normal position to said operated position to prevent operation of said fluid actuated valve means in response to the actuation of one of said trigger and safety valve means prior to the operation of the other of said valve means.

4. In a tool for driving fasteners into a workpiece using a fluid motor to actuate a fastener driver,
a trigger valve means,
a safety means actuated by placing the tool adjacent the workpiece,
means controlled by the trigger valve means and the safety means for controlling the application of pressurized fluid to the fluid motor,
a movably mounted means movable between a first position permitting the application of fluid to the fluid motor and a second position preventing the application of fluid to the fluid motor, said movably mounted means having a fluid pressure responsive surface,
and passage means communicating with the fluid pressure responsive surface and coupling said surface to the trigger valve means for controlling the fluid pressure applied to said surface so that the movement of the movably mounted means to its first and second positions is controlled in dependence on the sequence in which the trigger valve means and the safety means are operated.

5. The tool set forth in claim 4 in which
the tool includes a reservoir of pressurized fluid,
and the trigger valve means is operable to alternate positions connecting said surface to the reservoir and the atmosphere.

6. The tool set forth in claim 5 including
biasing means biasing the movably mounted means to its second position,
and in which the trigger valve means normally connects said surface to the reservoir to hold the movably mounted means in its first position against the bias of the biasing means.

7. The tool set forth in claim 6 in which
the biasing means includes pressurized fluid supplied in dependence on the position of the safety means, which pressurized fluid is removed by the actuation of the safety means.

8. In a tool for driving fasteners into a workpiece using a fluid motor to actuate a fastener driver,
a trigger valve means,
a safety means actuated by placing the tool adjacent the workpiece,
means controlled by the trigger valve means and the safety means for controlling the application of pressurized fluid to the fluid motor,
a movably mounted means movable between a first position permitting the application of fluid to the fluid motor and a second position preventing the application of fluid to the fluid motor, said movably mounted means having a fluid pressure responsive surface for controlling the movement of the movably mounted means,
and means including passage means supplying a biasing pressurized fluid to the fluid responsive surface on the movably mounted means and responsive to the position of the movably mounted means for permitting the trigger valve means and the safety means to effect the application of fluid to the fluid motor only when the safety means is operated first followed by the operation of the trigger valve means.

9. In a tool for driving fasteners into a workpiece using a fluid motor for actuating a fastener driver,
fluid controlled main valve means for controlling the application of fluid to the fluid motor,
a trigger valve means,
passage means coupled to the main valve means and selectively connected to fluid pressure and the atmosphere by the trigger valve means to control the operation of the main valve means,
a slidable valve in said passage means movable to a first position closing the passage means and to a second position opening the passage means, said slidable valve having two opposed fluid responsive surfaces, one of said surfaces being selectively coupled to fluid pressure and the atmosphere under the control of the trigger valve means,
a safety means actuated by positioning the tool adjacent a workpiece,
and valve means controlled by the safety means for selectively coupling the other surface on the slidable valve to fluid pressure and the atmosphere.

10. In a tool for driving fasteners into a workpiece using a fluid motor to actuate a fastener driver,
trigger valve means operable between a normal and an operated position to control the application of fluid pressure to the fluid motor,
safety means biased to a normal position and actuated to an operated position against the bias when the tool is placed adjacent the workpiece, the trigger valve means and the safety means each being independently operable between their normal and operated positions to permit the trigger valve means and the safety means to be actuated to their operated position in any sequence,
first control means operated when both the trigger valve means and the safety means are in their operated positions for rendering the fluid pressure effective to operate the fluid motor, and second control means for rendering the first control means ineffective unless the safety means is operated prior to the trigger valve means.

11. In a tool for driving fasteners into a workpiece using a fluid motor to actuate a fastener driver, trigger valve means operable between normal and operated positions to control the application of fluid pressure to the fluid motor, safety means biased to a normal position and actuated to an operated position against the bias when the tool is placed adjacent the workpiece, the trigger valve means and the safety means each being independently operable between their normal and operated positions to permit the trigger valve means and the safety means to be actuated to their operated position in any sequence, first control means operated when both the trigger valve means and the safety means are in their operated positions for rendering the fluid pressure effective to operate the fluid motor, and second control means operative following the actuation of the trigger valve means and the safety means to their operated positions for rendering the first control means ineffective to cause repeated operation of the fluid motor when the safety means is returned to its normal position and again actuated to its operated position.

12. In a tool for driving fasteners into a workpiece using a fluid motor to actuate a fastener driver, fluid controlled main valve means for controlling the application of fluid pressure to the fluid motor, trigger valve means, safety means operable when the tool is disposed adjacent the workpiece, said safety means including a safety valve means, passage means connected to and controlled by the trigger valve means and the safety valve means for selectively coupling fluid pressure and the atmosphere to the main valve means to control the operation of said main valve, the main valve means causing operation of the fluid motor only when both of the trigger valve means and the safety means are operated, and control means coupled to the passage means and effective only after the fluid motor has been operated by the operation of the trigger valve means and the safety means for rendering the passage means ineffective to control additional operations of the fluid motor under the control of subsequent releases and reoperations of the safety means so long as the trigger valve means is maintained operated.

13. The tool set forth in claim 12 in which the safety valve means has a first position supply fluid pressure to the passage means and a second position coupling the passage means to the trigger valve means.

14. The tool set forth in claim 12 in which the safety valve means has a first position in which a limited quantity of pressurized fluid is supplied to the passage means and a second position in which the passage means is placed in open communication with the trigger valve means.

15. In a tool for driving fasteners into a workpiece using a fluid motor to actuate a fastener driver, a reservoir of pressurized fluid in the tool, main valve means for controlling the application of fluid from the reservoir to the fluid motor and including a fluid control for controlling operation of the main valve means, a passage extending to the fluid control for selectively coupling the fluid control to the reservoir and the atmosphere, trigger valve means with an outlet coupled to the reservoir and the atmosphere in alternate positions of the trigger valve means, safety valve means having a normal position coupling the passage to the reservoir and an operated position coupling the passage to the outlet of the trigger valve means, the safety valve means being actuated to its operated position when the tool is disposed adjacent the workpiece, and a fluid operated valve movable between a first position placing the safety valve means in communication with the outlet of the trigger valve and second position closing off communication between the safety valve means and the outlet of the trigger valve means, said fluid operated valve having a pair of opposed fluid responsive surfaces for moving the fluid operated valve between said first and second position, a first one of said surfaces being supplied with fluid from the reservoir under the control of the trigger valve means and a second one of the fluid responsive surfaces being supplied with fluid under the control of the safety valve means.

16. The tool set forth in claim 15 in which the first fluid responsive surface is coupled to the outlet of the trigger valve means.

17. The tool set forth in claim 16 in which the safety valve means includes an additional valve which couples the second fluid responsive surface to the reservoir when the safety valve means is in its normal position and which couples the second fluid responsive surface to the atmosphere when the safety valve means is in its operated position.

18. The tool set forth in claim 15 in which the first and second fluid responsive surfaces are of equal area.

19. The tool set forth in claim 15 in which the first and second fluid responsive surfaces have differential areas.

*20. A fastener driving device including a portable housing, fluid pressure operated fastener driving means carried by said housing for movement through successive cycles of operation each of which includes a fastener driving stroke and a return stroke, fastener magazine means carried by said housing for receiving a supply of fasteners and feeding successive fasteners into a position to be driven into a workpiece during successive fastener driving strokes of said fastener driving means, fluid pressure control means including an actuating member carried by said housing for movement from a normal inoperative position into an operative position for initiating the movement of said fastener driving means through a fastener driving stroke, a work contact responsive member carried by said housing for movement from a normal inoperative position into an operative position in response to the movement of said device into cooperating engagement with a workpiece, and a trigger member carried by said housing for manual movement from a normal inoperative position into an operative position, the improvement in combination therewith which comprises enabling means operatively associated with said members for (1) enabling movement of said trigger member into its operative position when said work contact responsive member is in its inoperative position without move-*

*ment of said actuating member into its operative position, (2) enabling movement of said trigger member into its operative position when said work contact responsive member is in its operative position to effect movement of said actuating member into its operative position, and (3) enabling movement of said work contact responsive member into its operative position when said trigger member is in its operative position without movement of said actuating member into its operative position.*

*21. A fastener driving device including a portable housing having a handle adapted to be manually gripped by an operator, fluid pressure operated fastener driving means carried by said housing for movement through successive cycles of operation each of which includes a fastener driving stroke and a return stroke, fastener magazine means carried by said housing for receiving a supply of fasteners and feeding successive fasteners into a position to be driven into a workpiece during successive fastener driving strokes of said fastener driving means, fluid pressure control means including an actuating member carried by said housing for reciprocating movement from a normal inoperative position into an operative position for initiating the movement of said fastener driving means through a single fastener driving stroke and from said operative position into said inoperative position for initiating the movement of said fastener driving means through a single return stroke, a work contact responsive member carried by said housing for reciprocating movement adjacent said actuating member from a normal inoperative position into an operative position in response to the movement of said device into cooperating engagement with a workpiece and from said operative position into said inoperative position in response to the movement of said device out of cooperative engagement with the workpiece and a trigger member carried by said housing adjacent said actuating member in a position to be engaged by a finger of an operator grasping said handle for pivotal movement from a normal inoperative position into an operative position in response to digital pressure and from said operative position into said inoperative position in response to the release of said digital pressure, the improvement in combination therewith which comprises enabling means operatively associated with said members for (1) enabling movement of said trigger member into its operative position when said work contact responsive member is in its inoperative position without movement of said actuating member into its operative position, (2) enabling movement of said trigger member into its operative position when said work contact responsive member is in its operative position to effect movement of said actuating member into its operative position, and (3) enabling movement of said work contact responsive member into its operative position when said trigger member is in its operative position without movement of said actuating member into its operative position.*

*22. In a tool for driving fasteners into a workpiece using a pressurized fluid motor for actuating a fluid driving means, a manually actuated trigger means, a safety means actuated by placing the tool adjacent the workpiece, actuating means controlled by the trigger means and the safety means for controlling the application of pressurized fluid to the fluid motor, and a control means operatively associated with said trigger means and said safety means to prevent operation of the actuating means unless the safety means is first actuated followed by the actuation of the trigger means and to prevent operation of said actuation means upon said safety means being actuated subsequent to actuation of said trigger means.*

* * * * *